(12) United States Patent
White et al.

(10) Patent No.: US 7,689,997 B2
(45) Date of Patent: Mar. 30, 2010

(54) METHOD FOR ALLOCATING MEMORY TO TASKS WITHOUT EXCEEDING PREDEFINED MEMORY REQUIREMENTS

(75) Inventors: Peter Duncan White, Fountain Hills, AZ (US); Conan Brian Dailey, Scottsdale, AZ (US); Hua Chen, Tempe, AZ (US); Pamela Tam Carmony, Tempe, AZ (US); Jennifer Lynn Amstutz, Fountain Hills, AZ (US); Keith Michael Hines, Phoenix, AZ (US); Francis Gregory Sydnor, Jr., Scottsdale, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 1637 days.

(21) Appl. No.: 10/866,564

(22) Filed: Jun. 10, 2004

(65) Prior Publication Data
US 2004/0268356 A1  Dec. 30, 2004

Related U.S. Application Data

(63) Continuation of application No. 09/443,597, filed on Nov. 19, 1999, now Pat. No. 6,772,416.

(51) Int. Cl.
*G06F 9/46* (2006.01)
*G06F 13/00* (2006.01)

(52) U.S. Cl. .................. 718/104; 711/170; 718/100; 719/312

(58) Field of Classification Search .......... 711/145, 711/150, 152, 105, 170; 713/164; 718/102–104, 718/106, 107, 108, 100; 719/312
See application file for complete search history.

(56) References Cited

U.S. PATENT DOCUMENTS

| 5,504,814 | A | * | 4/1996 | Miyahara ................ 726/4 |
| 5,559,980 | A | * | 9/1996 | Connors et al. ........... 711/100 |
| 5,574,912 | A |   | 11/1996 | Hu et al. |

(Continued)

OTHER PUBLICATIONS

John Rushby, *Design and Verification of Secure System*, 8th Symposium on Operating System Principles, Dec. 14-16, 1981, vol. 15, No. 5, pp. 12-21.
*A Guide to Understanding Covert Channel Analysis of Trusted Systems*, National Computer System Principles, Nov. 1993, XP-002192422.

(Continued)

*Primary Examiner*—Lewis A Bullock, Jr.
*Assistant Examiner*—Charles E Anya
(74) *Attorney, Agent, or Firm*—Ingrassia Fisher & Lorenz, P.C.

(57) ABSTRACT

A computer-implemented system (90) is provided that supports a high degree of separation between processing elements. The computer-implemented system (90) comprises a plurality of cells (92) residing on the computer-implemented system, where each cell (92) includes a domain of execution (94) and at least one processing element (96); a separation specification (99) that governs communication between the processing elements (96); and a kernel (98) of an operating system that facilitates execution of the processing elements (96) and administers the communication between the processing elements (96) in accordance with the separation specification (99), such that one processing element (96) can influence the operation of another processing element (96) only as set forth by the separation specification (99). In particular, the separation specification provides memory allocation, remote procedure calls and exception handling mechanisms.

11 Claims, 7 Drawing Sheets

U.S. PATENT DOCUMENTS

| | | | |
|---|---|---|---|
| 5,574,914 | A | 11/1996 | Hancock et al. |
| 5,729,710 | A | 3/1998 | Magee et al. |
| 5,841,869 | A | 11/1998 | Merkling et al. |
| 5,890,189 | A * | 3/1999 | Nozue et al. ............... 711/100 |
| 5,893,159 | A * | 4/1999 | Schneider ................. 711/150 |
| 6,199,181 | B1 | 3/2001 | Rechef et al. |
| 6,292,874 | B1 * | 9/2001 | Barnett .................... 711/153 |
| 6,314,501 | B1 * | 11/2001 | Gulick et al. ............. 711/153 |
| 6,691,298 | B1 * | 2/2004 | Russo et al. ............... 717/100 |

OTHER PUBLICATIONS

*Setrlimit(2)*, Red Hat Linux/I386 5.2 Man Page, Jul. 23, 1993, XP-002192423.

ISA H et al, *Multi-threading Architecture for Multilevel Secure Transaction Processing*, May 1999, pp. 1-15.

Wahbe et al, *Efficient Software-Based Fault Isolation*, Aug. 1993, pp. 203-216.

* cited by examiner

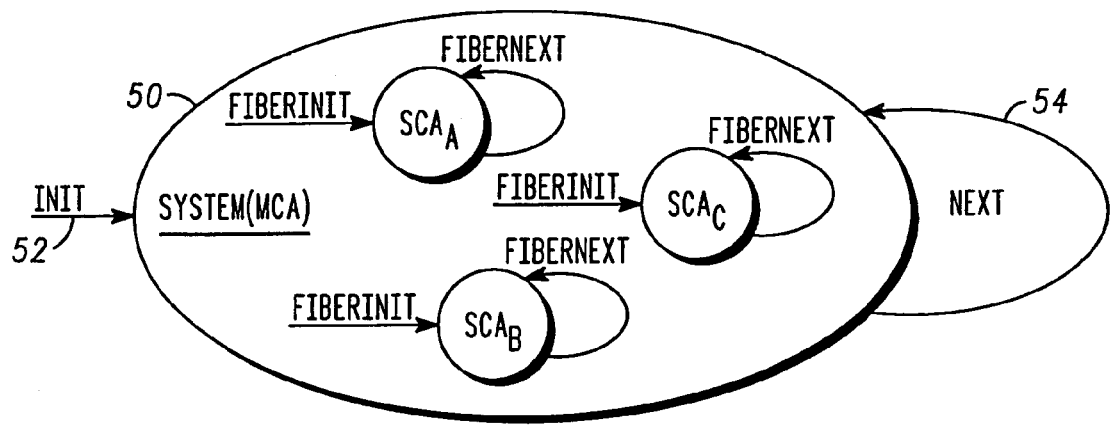
FIG. 8
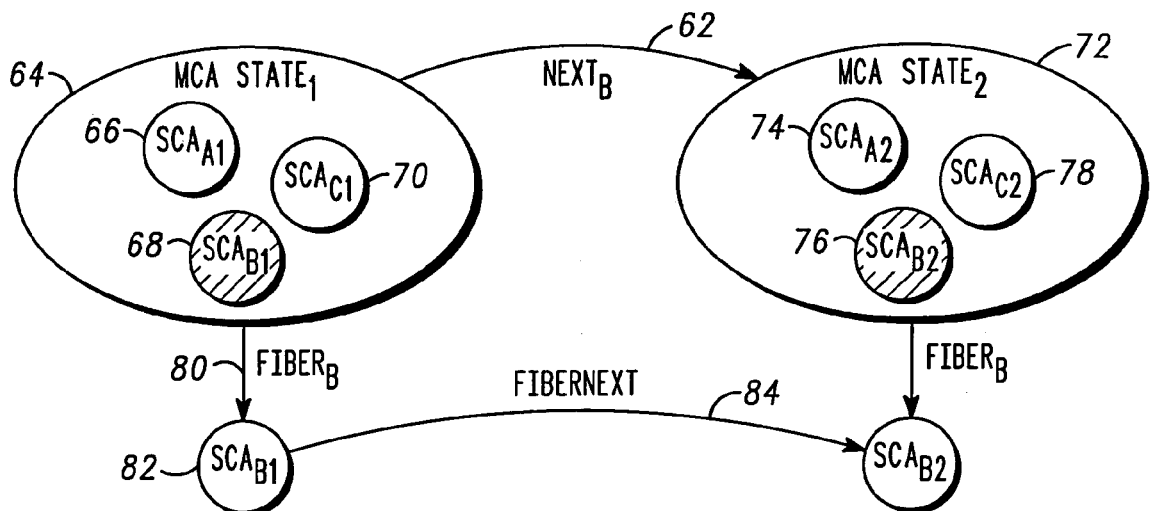
FIG. 9
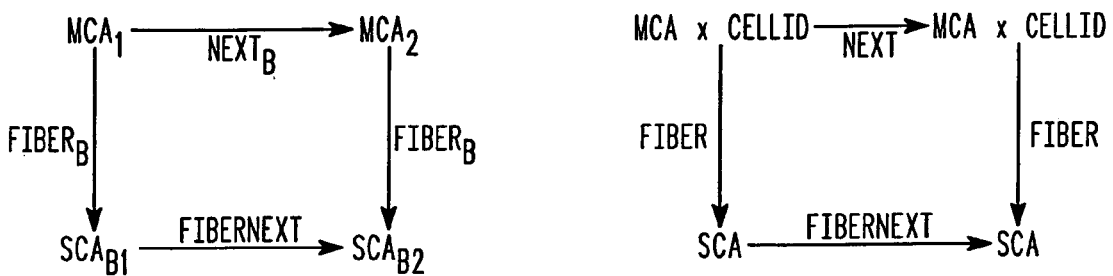
FIG. 10
FIG. 11

METHOD FOR ALLOCATING MEMORY TO TASKS WITHOUT EXCEEDING PREDEFINED MEMORY REQUIREMENTS

CROSS-REFERENCES TO RELATED APPLICATIONS

This application is a continuation of U.S. application Ser. No. 09/443,597 filed Nov. 19, 1999 now U.S. Pat. No. 6,772,416.

BACKGROUND OF THE INVENTION

1. Technical Field

The present invention relates generally to using the separation principle to design a kernel of an operating system, and more particularly, the present invention relates to a kernel that applies the separation principle to memory allocation, remote procedure call and exception handling mechanisms.

2. Discussion

Separation is an extremely important property in the construction and analysis of secure systems. If two logical entities A and B (for example, two pieces of software) are separate, then separation means that there is no way for A to influence the operation of B, and vice versa. If the operation of A is important to the security of a system, the separation of A and B means that the operation of B can be ignored when evaluating how A supports the security of the system. If A and B are not separate, so that B could influence the operation of A, then both A and B must be considered in evaluating how A supports the security of the system. The necessity of evaluating A and B increases the difficulty and cost of the security evaluation, and usually yields a lower assurance of security. Thus lack of separation yields the combination of higher cost and lower assurance.

Complete separation (no influence between A and B) yields a conceptually clean system. Incomplete separation can still be very good if there are a small (e.g. one, two, or three) number of known influence paths between A and B, and these paths have low bandwidth and/or are difficult to use. Incomplete separation is unacceptable in a high assurance system when it results from the inherent complexity of the system, and the resulting inability to analyze the possible.

Separation is a principal that has been investigated for the construction of secure systems for some time. The idea behind separation can be described with the assistance of FIG. 1. A system is sometimes implemented as a set of separate physical devices, with the devices interconnected by physical wires. In FIG. 1, if it is important to the security of the system that $box_1$ does not directly intercommunicate with $box_4$, then one need only look at the arrangement of the physical boxes and wires to determine the truth of this property.

It is often the case that the same system will be implemented in one physical box, but with logical entities (e.g. software processes) performing the same functions as the physical boxes of FIG. 1. This new implementation may result from increasing miniaturization of components, or the increasing memory and processing power available within on processor platform. This new implementation of the same system is depicted in FIG. 2. The tasks are performing the same functions and are interconnected in the same way as the boxes of FIG. 1. If it was important before that $box_1$ does not directly intercommunicate with $box_4$, then it is still important that $task_1$ does not directly intercommunicate with $task_4$.

Analyzing the system of FIG. 2 may not be as easy as it was in FIG. 1. The reason for the increasing difficulty of analysis is shown in FIG. 3.

The problem is that all of the tasks communicate with the operating system, thus the operating system becomes a means whereby information can be transmitted between tasks, and tasks can influence each other even when not permitted by the communication policy of the operating system. FIG. 3 shows $task_3$ influencing $task_1$ by means of operating system mechanisms. A standard example of this is memory allocation. If all of the tasks allocate memory from a shared pool of resources, then $task_3$ could allocate all of the memory. When $task_1$ runs and attempts to allocate memory, it will receive a failing return from the operating system. This failing return could encode a "1" transmitted from $task_3$ to $task_1$. If $task_3$ then releases some memory, when $task_1$ runs, it will try to allocate some memory again, this time receiving a successful return from the operating system. This successful/failure return from the operating system was never intended to be used as a communication channel, nevertheless a good hacker can make use of it in this way. In other words, the problem is that the other software (e.g., other tasks and the operating system) can now influence the operation of the task under analysis, and thus the task under analysis cannot be analyzed in isolation.

Therefore, it is desirable to provide a high-grade separation between processing elements in a system. This high-grade separation permits the system designer to establish high assurance secure systems by allowing each processing element to be analyzed in isolation. To achieve high-grade separation, the present invention applies the separation principle to the design a kernel of an operating system. More specifically, the kernel incorporates memory allocation, remote procedure call and exception handling mechanisms in such a way that supports the separation concept.

BRIEF DESCRIPTION OF THE DRAWINGS

The present invention will hereinafter be described in conjunction with the appended drawing figure(s), wherein like numerals denote like elements, and:

FIG. 8 is a diagram depicting a multiple cell abstraction system;

FIGS. 9-11 illustrate the fundamental relationships and equations that define the separation specification of the present invention;

DETAILED DESCRIPTION OF THE PREFERRED EMBODIMENTS

The present invention generally relates to designing a kernel of an operating system in accordance with the separation principle. A framework for designing the separation kernel is set forth below. It is to be understood that this framework, the subsequent description of the separation principle and its application to the design of the kernel are merely exemplary and are intended to provide an understanding of the nature and character of the invention as it is claimed.

In accordance with the present invention, the principle abstraction for the framework is the cell. A cell is defined as a domain of execution and a collection of strands, where each strand is a stream of programmable machine instructions executable by the kernel of the operating system. For purposes of the following description, a domain of execution is also referred to as the context of the cell and a strand is also referred to as a task.

Figure 1:
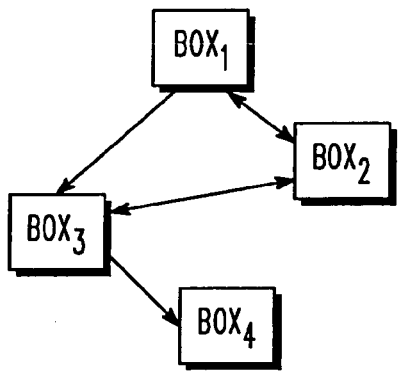
FIG. 1 is a diagram depicting a box and wire model for a typical system architecture.
Figure 2:
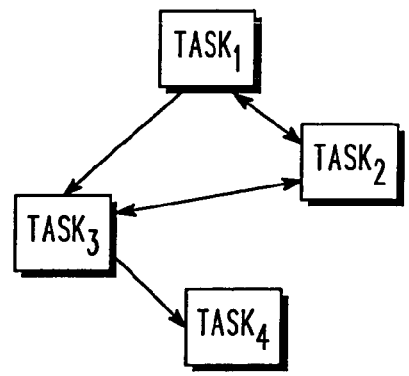
FIG. 2 is a diagram depicting a task model that may reside on a physical device in a typical system architecture.
Figure 3:
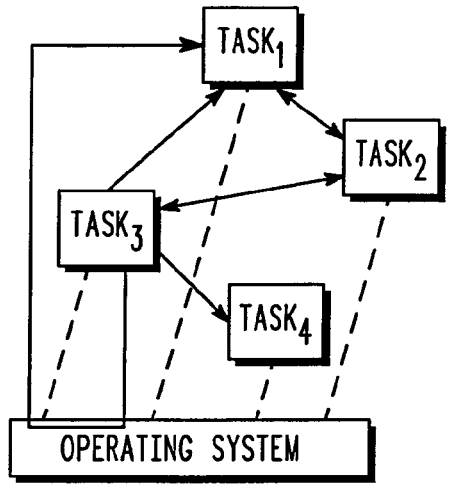
FIG. 3 is a diagram depicting the task model that is supported by an operating system in a typical multi-tasking architecture.
Figure 4:
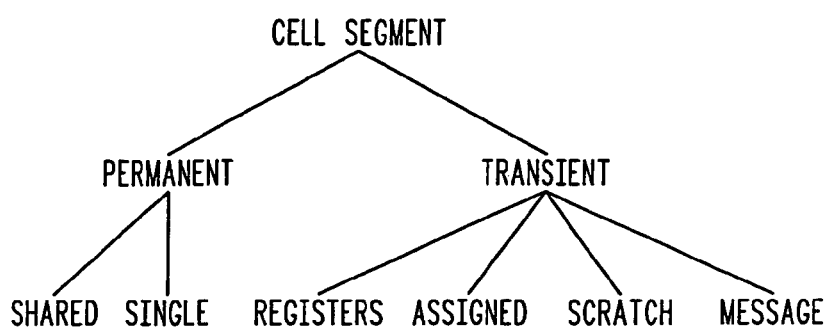
FIG. 4 is a diagram illustrating the different types of memory segments supported by the framework of the present invention.

The context of a cell is comprised of one or more memory segments. Each segment is a range of physical memory addresses, which are defined by a starting address and a length. The framework of the present invention supports different types of memory segments as shown in FIG. 4.

Permanent segments are allocated to a cell and therefore are accessible to any of the strands associated with the cell. Permanent segments may be used for storing data, code (i.e., a strand's machine instructions) or memory mapped hardware interfaces. Permanent segments cannot be sent in messages, but are retained when the currently executing strand of the cell suspends.

In contrast, a transient segment is accessible to the strand, which is running in the cell, and to the cell. In other words, each strand has predefined memory requirements for its transient segments. When the strand is launched, the transient segments are allocated for the strand. Thus, the transient segments are accessible to the strand. As will be more fully explained below, the framework supports different types of transient segments, such as an input message segment, a scratch segment, an assigned segment, and a register segment.

Figure 5:
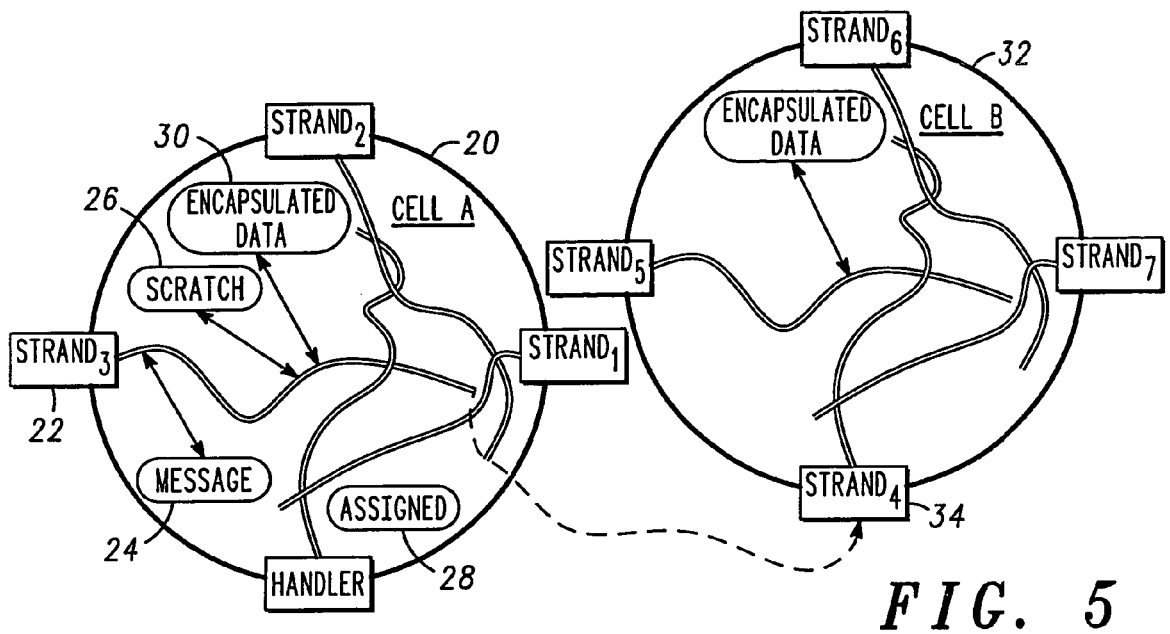
FIG. 5 is a diagram illustrating the cell abstraction concept of the present invention.

An overview of the framework, including the cell abstraction concept and its interrelationships, are further discussed in relation to FIG. 5. Each cell can execute only one strand at a time. $Strand_3$ 22 is currently running in $Cell_A$ 20. It is processing an input message 24, which is made up of one or more transient segments. $Strand_3$ 22 may use one or more scratch segments 26 to process the input message 24. A scratch segment is a temporary memory space of sufficient size to be used by the strand when processing the input message. $Strand_3$ may also access an assigned segment 28. An assigned segment is a specified transient segment used to gain access to available resources, such as device registers. Lastly, $Strand_3$ may access one or more permanent segments. For instance, the encapsulated data segment 30 contains static data used by the strand.

$Cell_B$ 32 is currently not executing a strand. However, it may begin execution of a strand some time after it is granted access to an input message received from $Strand_3$ 22 of $Cell_A$ 20. In FIG. 5, $Strand_4$ 34 is shown being launched in $Cell_B$. When a strand in the cell is launched, the cell receives access to the message segment(s) that make up the input message. Again, the strand may require scratch segments to process the input message. In addition, an interrupt strand may be run immediately upon receipt of an interrupt. Thus, the execution of a strand may be interleaved with the execution of interrupt strands.

Figure 6:
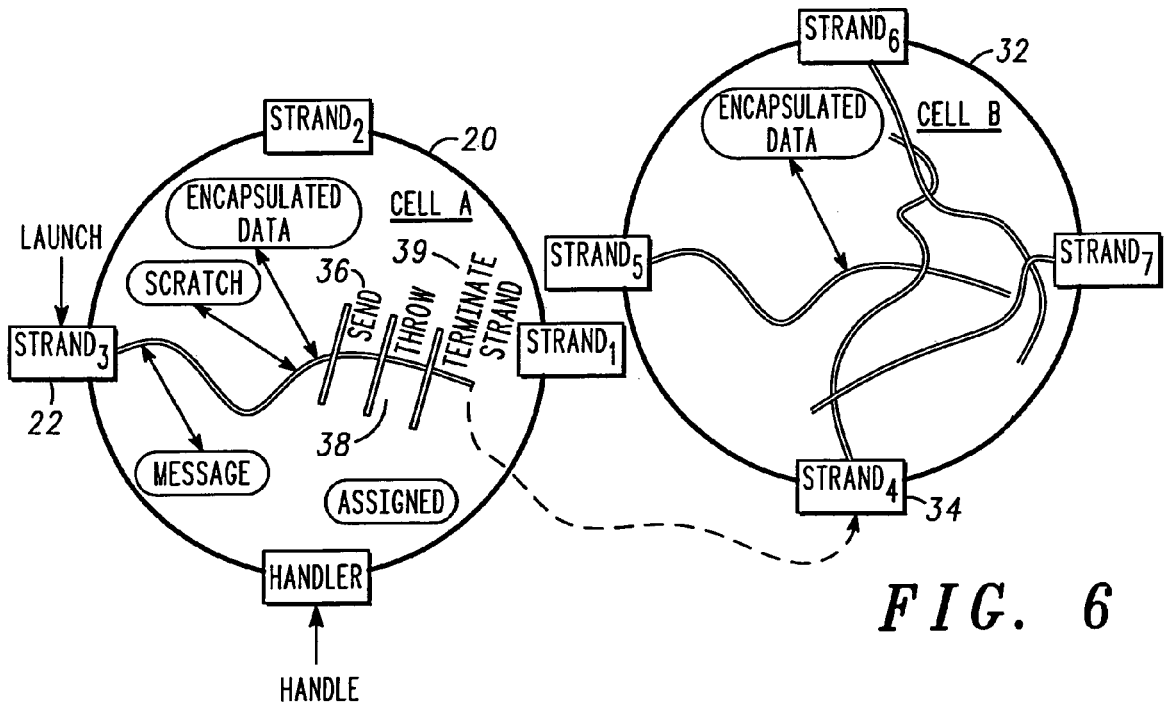
FIG. 6 is a diagram illustrating the interaction between cells in accordance with the present invention.

A cell interfaces to its external world (e.g., to other cells or the underlying hardware) only through the substrate. For purposes of this discussion, the substrate is defined as the operating system, the device drivers, and the underlying hardware of the system. Exemplary cell interfaces are illustrated in FIG. 6. First, the kernel of the operating system launches $Strand_3$ 22 of $Cell_A$ 20. At this time, the strand is given access by the kernel to its input message segment(s) and scratch segment(s). Next, $Strand_3$ 22 uses a Send interface 36 to send some of its transient segments to $Strand_4$ 34 of $Cell_B$ 32. As a result, $Cell_A$ loses access to the segments transmitted by the strand.

After further execution of the strand, $Strand_3$ of $Cell_A$ addresses an exception condition through the use of a Throw interface 38. The interface terminates execution of the strand and initiates execution of a Handler function. When execution of $Strand_3$ of $Cell_A$ terminates, the kernel removes access to all of the transient segments remaining in $Cell_A$. If $Strand_3$ of $Cell_A$ had not terminated via the exception condition, it would have reached the end of its strand. In this case, the TerminateStrand interface 39 terminates the execution of the strand and removes access to any transient segments still accessible to the cell. One skilled in the art will readily recognize that the separation kernel of the present invention will be designed and implemented within the above-described framework. Data structures that define and describe the strands and cells in the above-described framework are further discussed in the Appendix.

Figure 7:
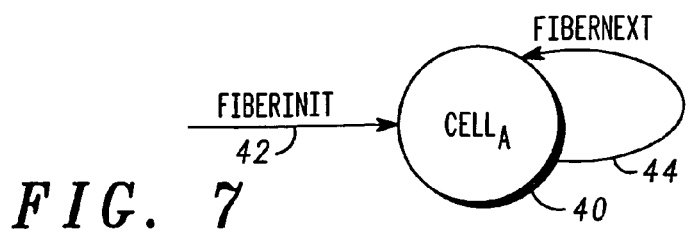
FIG. 7 is a diagram depicting a single cell and two cell operations in accordance with the separation principle of the present invention.

An introduction to the separation principle is provided in relation to FIGS. 7-11. FIG. 7 shows a cell 40 and two of its operations, FiberInit 42 and FiberNext 44. Again, the cell represents an execution domain. Moreover, the cells are the components of the system to be separated.

In FIG. 8, several cells have been combined into a system 50 that is referred to as the Multiple Cell Abstraction, where each individual cell is referred to as a Single Cell Abstraction (SCA). Each cell has its own FiberInit and FiberNext operations, whereas the system as a whole has an Init 52 and Next 54 operation. Since the cells serve as the Fibers of the system, the names for the cell level operations are FiberInit and FiberNext. The names Init and Next are reserved for the system level operations.

There are several choices for defining the relationship between these cell operations. For instance, the Next operation (advancing the system state) could correspond to a FiberNext operation (advancing a cell state) on every cell at once, thereby implying multiprocessing of the cells. On the other hand, the Next operation could correspond to a FiberNext operation on only one cell or on some subset of the cells. There are similar design choices for the Init and FiberInit operations. The separation specification of the present invention defines the Next operation to advance a cell state only one cell at a time and the Init operation to initialize the cell state of all the cells at once. Therefore, the system state advances one cell at a time, but the initialization of the system is not complete until all of the cells are ready to run.

FIG. 9 depicts this design choice for the separation specification of the present invention. In this figure, the $Next_B$ operation 62 is being performed on the system, where the $Next_B$ operation is the Next operation performed on $Cell_B$. The state of the system before the Next operation is shown as MCA State$_1$ 64. MCA State$_1$ 64 includes $Cell_A$ in state $SCA_{A1}$ 66, $Cell_B$ in state $SCA_{B1}$ 68 and $Cell_C$ in state $SCA_{C1}$ 70. The state of the system after the Next operation is shown as MCA State2 72, where $Cell_A$ is in state $SCA_{A2}$ 74, $Cell_B$ is in state $SCA_{B2}$ 76 and $Cell_C$ is in state $SCA_{C2}$ 78. The $Next_B$ operation at the system level corresponds to selecting a cell and advancing the state of that one cell.

FIG. 9 further illustrates that performing $Next_B$ on MCA$_1$ achieves the same result as taking Fiber$_B$ 80 of MCA$_1$ to yield $SCA_{B1}$ 82, and then performing FiberNext 84 on $SCA_{B1}$. In this case, $Cell_B$ is selected by the Fiber$_B$ operation. Performing the FiberNext operation upon $Cell_B$ advances the state of $Cell_B$. In equation form, this is:

$$Fiber_B(Next_B(m)) = FiberNext(Fiber_B(m))$$

FIG. 10 is a commuting diagram, which is a diagrammatic form of the above equation. The internal cells of MCA have been hidden from the external world and can be observed only through the Fiber operation. This equation can be further shortened to:

$$Fiber_B \cdot Next_B = FiberNext \cdot Fiber_B$$

In this short form, the variable m has been dropped. In addition, the equation is between two functions, rather than the value of the functions at an arbitrary input. The symbol denotes function composition.

The final form of this relationship is shown in FIG. 11. In this figure, the functions $Next_B$ and $Fiber_B$ have been uncurried into Next and Fiber. This means that the function $Next_B$ is related to Next by the equation $Next_B(m) = Next(m, B)$ for $Cell_B$. In general, NextX is related to Next by the equation $NextX(m) = Next(m, x)$ for any cell X. Since $Next_B$ was changed to Next, and Fiber$_B$ was changed to Fiber, the CellID parameter is no longer contained in the subscript of the operator, so this must be made explicit in the domain of the Next and Fiber functions. This is why MCA is combined with CellID in the product MCA X CellID. The equations corresponding to FIG. 11 are given as follows:

$$Fiber(Next(m, c)) = FiberNext(Fiber(m, c))$$

$$Fiber \cdot Next = FiberNext \cdot Fiber$$

In simple terms, what these fundamental equations are saying is that when the system state is advanced by one step, the change in the system state corresponds to a change in the state of one of its cells, as identified by the Fiber function. If you look at the system state before advancing it one step and again after advancing it one step, then there will be a unique cell c, which accounts for this advance in the state of the system. This cell c accounts for the advance in the state of the system by advancing its own single cell state by one step.

The operators Init and Next are specified to be the constructors of the MCA. This means that all possible MCA states are the result of system initialization and the advancement of the system state one step at a time by the Next operation. This specifies that the system cannot land in any "unspecified" states that might not satisfy the security constraints of the system. There is a similar constraint upon the SCA that states that any SCA must be the result of a Fiber operation on an MCA. Since the MCA is constrained to be in valid states, as constructed by Init and Next, this constrains the SCAs to be in valid states resulting from taking a Fiber of a valid MCA.

In sum, the system under consideration is the Multiple Cell Abstraction (MCA). The elements of the system to be separated are the cells as represented by the Single Cell Abstraction (SCA). The relationship between the system and its cells is given in several forms by the above-described fundamental equations. These fundamental equations in turn serve as the basis for the separation specification of the present invention. (SCA). The relationship between the system and its cells is given in several forms by the above-described fundamental equations. These fundamental equations in turn serve as the basis for the separation specification of the present invention.

Figure 12:
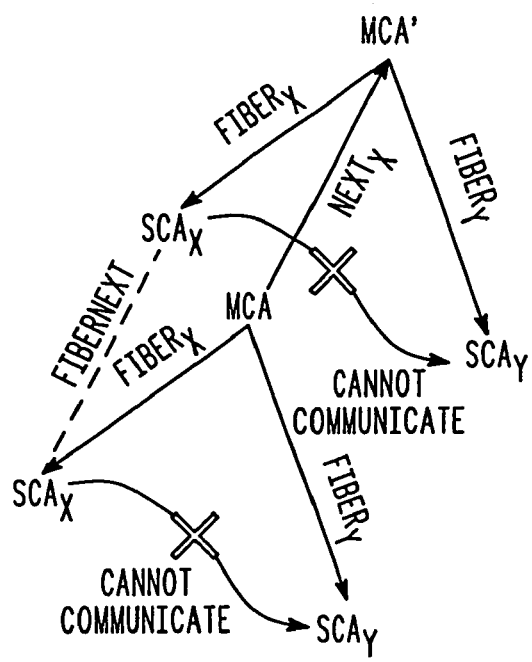
FIGS. 12 and 13 illustrate the first and second separation axioms, respectively, in accordance with the separation specification of the present invention.

The separation specification is further defined by two separation axioms. FIG. 12 depicts a First Separation Axiom, which sets forth the communication policy between cells. Since the communication policy references the concept of a cell, it is logical that the statement of the communication policy should reference the definitions of the Next and Fiber functions. Indeed, one of the purpose for separating the system into cells is to restrict communication within the system. Accordingly, FIG. 12 describes an equation stating that cell $SCA_x$ can influence cell $SCA_y$ only if cell $SCA_x$ is permitted to communicate with cell $SCA_y$ by the communication policy enforced by the kernel. The communication policy is alternatively recited by the following equations:

$$\neg \text{Communications}(x, y) \Rightarrow Fiber_y(MCA) =$$
$$Fiber_y(Next_x(MCA)) \; Fiber_y(MCA) \neq Fiber_y(Next_x(MCA)) \Rightarrow$$
$$\text{Communicates}(x, y)$$

In this case, the second equation (i.e., the contrapositive form of the first equation) states that if the fiber of cell y changes as the result of advancing the state of cell x, it must be the case the x is permitted to communicate with y. In its positive form, the equation states that if cell x cannot communicate with cell y, then whenever the state of cell x is advanced, there is no change in the state of y. A particular consequence of this communication policy is that cell x can send messages to y only if cell x has permission to communicate with y.

Figure 13:
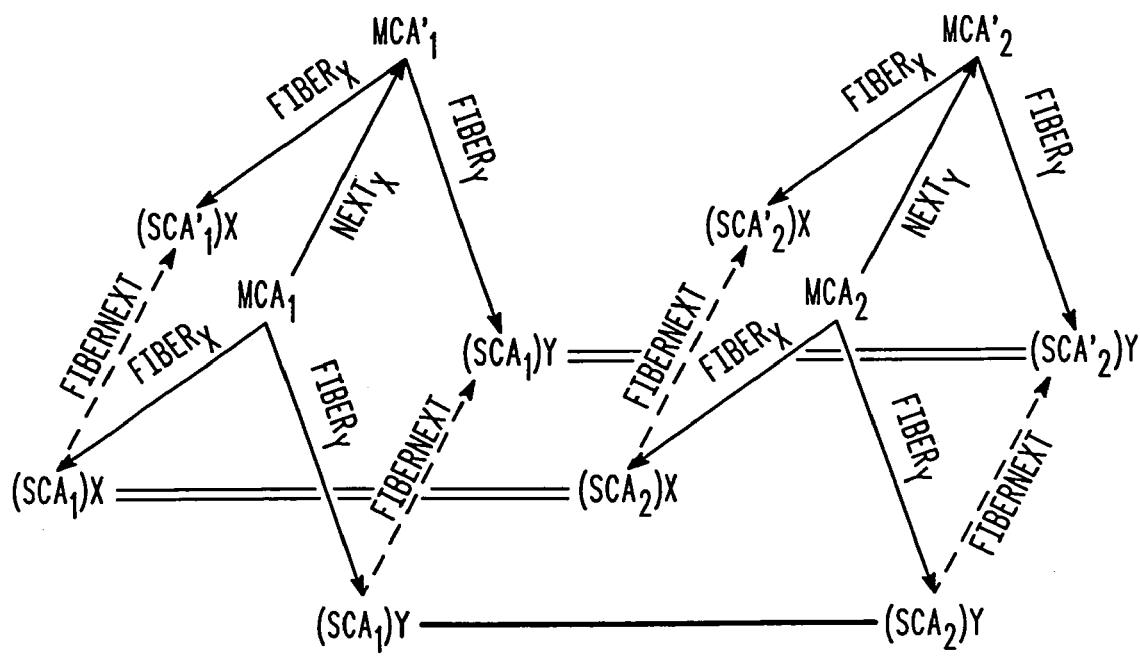

The Second Separation Axiom is depicted in FIG. 13. It should be noted that this diagram is not a commuting diagram. This diagram depicts the following equations:

$$SCA_{1x} = Fiber_x(MCA_1) \quad SCA_{2X} = Fiber_x(MCA_2)$$
$$SCA_{1y} = Fiber_y(MCA_1) \quad SCA_{2y} = Fiber_y(MCA_2)$$
$$SCA'_{1x} = Fiber_x(MCA'_1) \quad SCA'_{2X} = Fiber_x(MCA'_2)$$
$$SCA'_{1y} = Fiber_y(MCA'_1) \quad SCA'_{2y} = Fiber_y(MCA'_2)$$

$$(Fiber_x(MCA_1) = Fiber_x(MCA_2)) = >[$$
$$((Fiber_y(MCA_1) = Fiber_y(MCA_2)) = >$$
$$(Fiber_y(Next_x(MCA_1) = Fiber_y(Next_x(MCA_2))))]$$
$$Fiber_y(Next_{\underline{x}}(MCA_1)) \neq Fiber_y(Next_{\underline{x}}(MCA_2)) = > (Fiber_x($$
$$MCA_1) \neq (Fiber_x(MCA_2))v(Fiber_y(MCA_1 \neq Fiber_y(MCA_2))$$

In accordance with these equations, if an action by cell x (e.g., advancing the state of the SCA for cell x) is going to change the state of cell y, then the change in the state of y depends only on the states of x and y. Without this axiom, an unknown cell could affect the state of y. For instance, if x changes y, it could do so by copying everything from a third cell z into the SCA of y. The purpose of this axiom is to prevent "undesirable" connections between cells such as z and y.

Accordingly, the first equation states that if x has the same fiber in two different system states $MCA_1$ and $MCA_2$, and y has the same fiber in $MCA_1$ and $MCA_2$, then y has the same fiber after advancing the state x in both $MCA_1$ and $MCA_2$. The contrapositive form of this equation (i.e., the second equation) may be more revealing. It says that if advancing x causes a change in the state of y, then the change must have resulted from either a change in the state of x or a change in the state of y.

Figure 14:
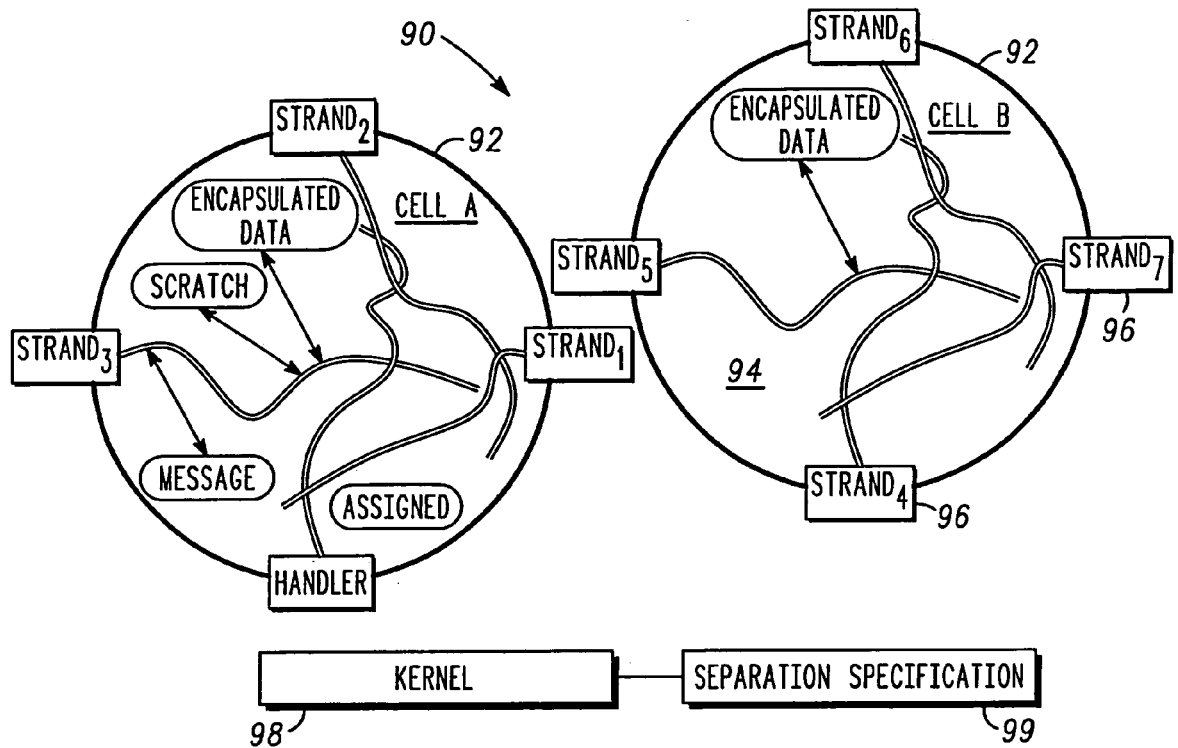
FIG. 14 depicts a separation kernel that supports a high degree of separation between processing elements in a computer-implemented system in accordance with the present invention.

To implement a separation kernel, the designer must choose features that support the intended applications and implement those features in a way that conforms to the above-described separation property. In accordance with the present invention, a computer-implemented system 90 that supports a high degree of separation between processing elements is shown in FIG. 14. The computer-implemented system 90 comprises a plurality of cells 92, where each cell includes a domain of execution 94 and at least one processing element 96. A kernel 98 facilitates execution of the processing elements and administers the communication between the processing elements in accordance with a separation specification 99. The separation specification 99 governs communication between the processing elements, such that one processing element can influence the operation of another processing element only as set forth by the separation specification.

A preferred implementation of the kernel and its separation specification has selected several features that are required by the applications of the kernel and can be made to fit the separation principle. First, memory allocation is a selected feature because the intended applications are required to process many kinds of data which often require added memory resources to efficiently process the data. Since the applications require time-shared access to hardware resources, the hardware resources are allocated as memory mapped segments to the cells in a way that preserves the separation property. Second, remote procedure call procedure is a selected feature because many intended applications require a communications mechanism beyond a simple send-message. The remote procedure call is a communication mechanism in which information is provided to a server, the server processes the information and returns a result, and the processing continues in the same context that existed before the service was invoked. Third, exception handling is a selected feature because the intended applications are required to be robust with respect to exceptions. Since exceptions can be handled locally with assurance that the direct cause of the exception is local, exception handling is also improved by the separation principle. Each of these selected features (i.e., memory allocation, remote procedure calls and exception handling) is further described below.

Figure 15:
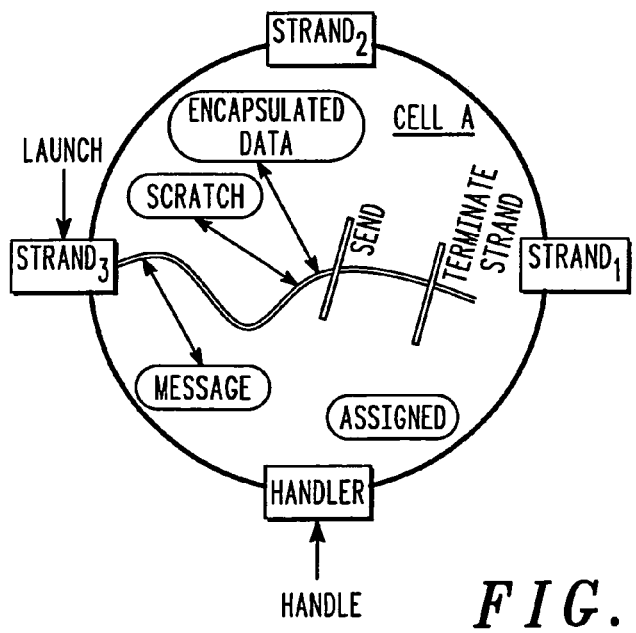
FIGS. 15-17 illustrate various operations of a strand in a cell in accordance with the present invention.

A memory allocation mechanism in the separation kernel of the present invention is understood in relation to the operation of a strand as shown in FIG. 15. At strand launch time, a strand is allocated the memory it requires according to its predefined memory requirements. The strand memory requirements are constant for that strand, in that they are the same each time the strand is launched. The strand receives two kinds of transient segments upon strand launch: message segments and non-message segments. Message segments are segments, which have been sent by some other strand to the strand being launched. It is the existence of this message that causes the strand launch. Non-message segments are the other transient segments, which are described by the predefined memory requirements for the strand.

As the strand executes, it undergoes interactions with the kernel. If the strand elects to send some of its transient segments as part of an input message to another strand, then access to the transient segments is lost at this point. Thus, the strand can lose access to transient segments as it executes, but it cannot gain access to any more transient segments as it executes.

Figure 18:
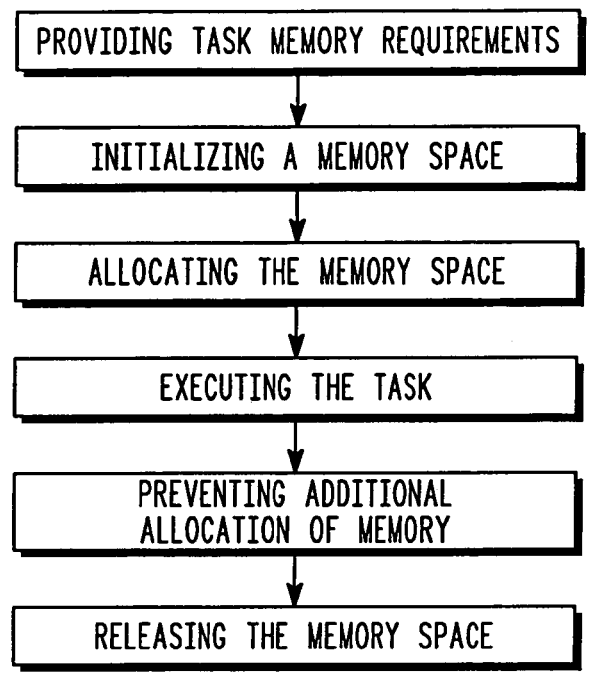
FIG. 18 illustrates a method for allocating memory in accordance with the present invention.

In order to achieve separation within the kernel, the allocation of transient segments for a strand obeys the following properties: (1) before strand launch, the strand has access only to the permanent segments of the cell; (2) transient memory requirements for a strand are a function of the strand, and thus are known at compile time; (3) the kernel does not launch the strand until there is sufficient memory to satisfy all of the memory requirements for the strand; (4) transient segments that are non-message segments are initialized before allocation; (5) as the strand executes, it can lose memory segments (e.g., by sending a message), but it cannot allocate any more segments; and (6) strand termination causes all transient segments to be released by the kernel. From these properties, it may be concluded that after strand termination, the strand has access only to the permanent segments of the cell and each time a strand runs, the amount of memory available is the same, as specified by the predefined memory requirements for the strand. FIG. 18 illustrates a method for allocating memory by a separation kernel in accordance with the above-described principles.

As a result, a strand sees exactly the same amount of allocated memory each time it runs. Thus, there is no covert channel stemming from the amount of allocated memory. This eliminates the typical memory allocation covert channel that results from the ability of one process to cause resource exhaustion.

However, there may be still one covert channel if the memory addresses of the allocated transient segments are visible to the strand as it executes. In this case, it may be possible to manipulate the addresses of the available memory segments to communicate information to a strand to be launched. This channel can be eliminated if the underlying hardware supports address translation. In this case, the strand would see the allocated segments at the same logical address each time it runs. Thus, the strand would have the same amount of allocated transient memory, at the same address, every time it runs.

Figure 16:
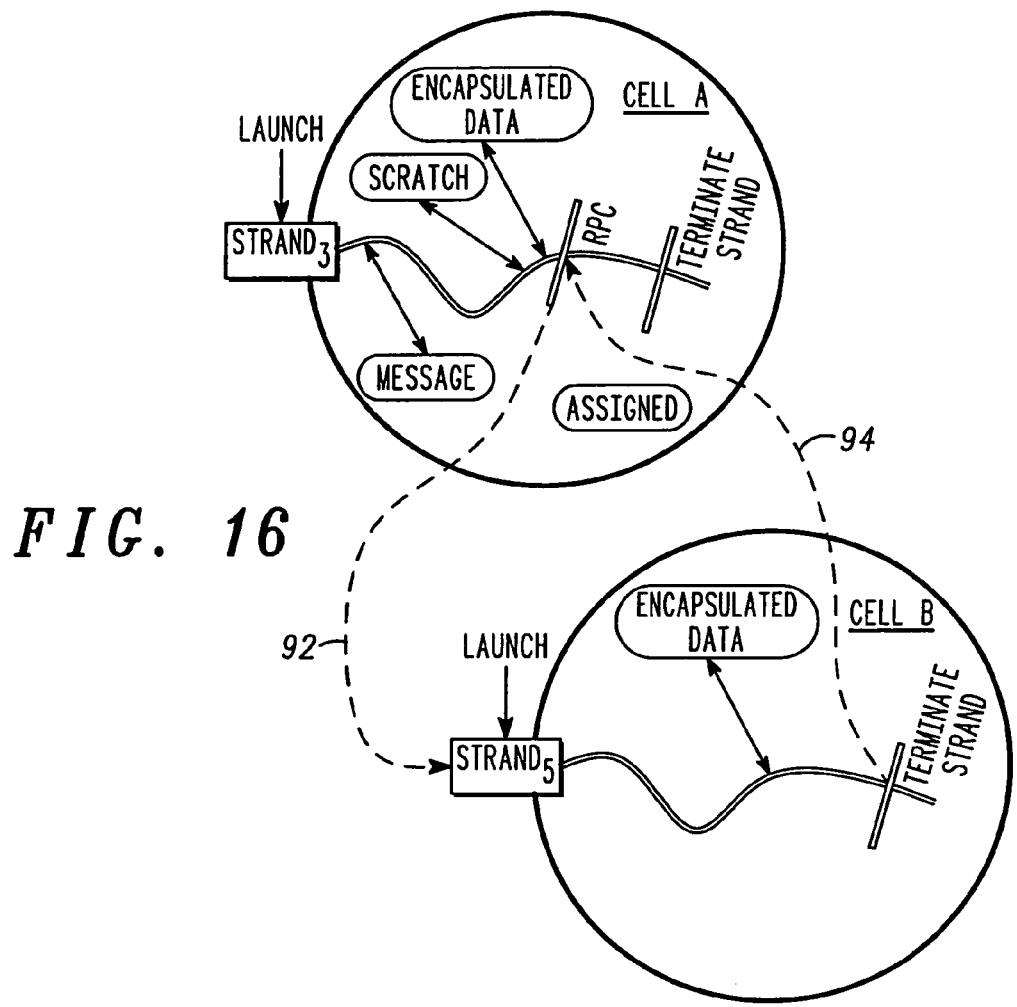

Referring to FIG. 16, the separation kernel of the present invention also implements a remote procedure call mechanism. During the execution of the strand, the $Strand_3$ may makes a remote procedure call 92 to $Strand_5$ in the target cell (i.e., $Cell_B$). As part of the remote procedure call, some of the transient segments of the source strand are sent to the target strand. At this point, these transmitted segments become inaccessible to the source strand and accessible to the target strand. These transmitted segments constitute the parameters of the remote procedure call.

When the target strand is launched, the target strand only gets access to the input transient segments and the permanent segments of the target cell. Since there are no additional memory segments to allocate, it can be concluded that there are sufficient resources to execute the remote procedure call. In other words, the remote procedure call cannot fail on account of insufficient resources. The kernel is designed to ensure that internal kernel resources will be sufficient to process the remote procedure calls, so that no resource exhaustion covert channel is provided by the kernel itself. Therefore, it is not possible for the remote procedure call to fail on account of insufficient resources within the kernel.

In FIG. 16, the target strand terminates using the normal strand termination mechanism. The target strand returns a value 94 to the calling strand. In addition, the transmitted segments are made inaccessible to the target strand and made once again made accessible to the source strand. This means that before and after the remote procedure calls the same set of segments are accessible to the source strand. If the target strand is terminated for any other reason, the remote procedure call mechanism causes a return to the source strand, and thus guarantees a return from the remote procedure call.

During its execution, the target strand is prohibited from sending the transmitted segments as part of a send message. Thus, the segments remain available to be returned to the source strand. Furthermore, the target strand can make a remote procedure call of its own. To do so, the target strand retransmits one or more of the transmitted segments to another target strand. When this additional remote procedure call is completed, the re-transmitted segments are returned to the target strand.

Figure 19:
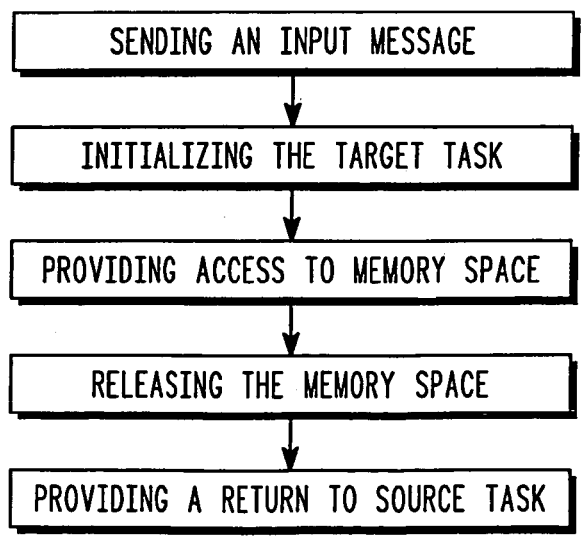
FIG. 19 illustrates a method for performing remote procedure calls in accordance with the present invention.

It should also be noted that the remote procedure call mechanism does not allow recursive calls, i.e. calls to strands in a cell that is already part of the remote procedure call stack. In addition, the remote procedure call mechanism also does not permit a call to a cell that already has an executing strand, thereby preserving the property that only one strand of a cell can run at any one time. This is an important property to prevent re-entrant code. Re-entrant code can cause various runtime errors. FIG. 19 illustrates a method for performing remote procedure calls in accordance with the above-described principles.

Figure 17:
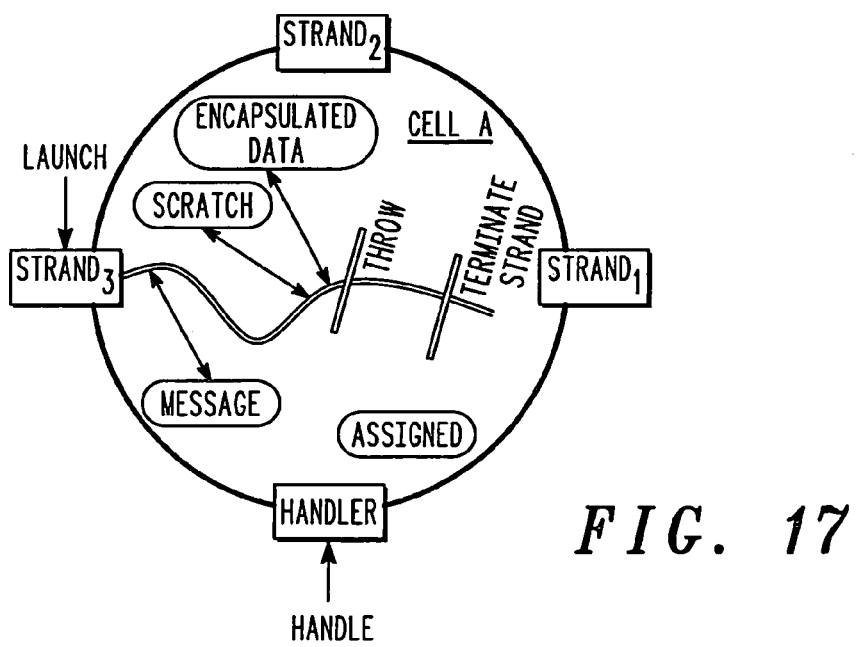

Lastly, the separation kernel of the present invention implements an exception handling mechanism. During the execution of a strand, the strand may generate an exception. As will be apparent to one skilled in the art, the exception may be caused by a variety of conditions, including a divide by zero or an invalid address condition (i.e., an address that is not within one of the segments accessible to the strand). The strand can raise an exception intentionally by calling the Throw() interface as shown in FIG. 17.

The kernel in turn processes the Throw() interface by transferring control to the exception handler of the cell. The kernel also passes the cause of the exception in a register to the exception handler. The exception handler runs in the same context as the strand that incurred the exception. Therefore, the exception handler has access to the same permanent and transient segments as the strand that incurred the exception.

The exception handler has the option of attempting to resume processing of the strand that incurred the exception or terminating the execution of the strand. In FIG. 17, it is assumed that the exception handler resumes processing of the strand that incurred the exception. Thus, the strand completes execution and then terminates.

Each strand has a maximum exception count. When the strand incurs a number of exceptions equal to the maximum exception count, the strand is terminated by the kernel. Thus, there is no way to get stuck in a loop of exceptions, which in turn causes, more exceptions. On the contrary, the strand will be terminated when the maximum exception count is reached.

As a result of the above-described exception handling mechanisms, exceptions are confined to the cell that contains the strand that incurred the exception. Accordingly, the exception handling mechanism enhances the separation property by providing exception handling that is separate between cells.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

APPENDIX

The data structures that define and describe the strands and cells in the previously described framework are central to the cell abstraction concept, the separation specification, and the implementation of a separation kernel. Therefore, these data structures are defined to permit a better understanding of how the separation kernel may be implemented in accordance with the present invention.

Cell Descriptions

All of the information in the cell descriptor is static information about the cell. There are four items in the cell descriptor:

PermanentSegmentList: The segments that are permanently allocated to the cell. All the strands of the cell get access to these segments when they run. These segments would typically contain the code and cell state information for the application represented by the cell. Permanent segments can be restricted to a single cell or can be shared between more than one cell. The permanent segment list described the access mode to the segment (some combination of read, write, and execute) desired by the cell.

Handler: The address of the exception handler for the cell.

SendMap: The set of cells to which this cell can send messages. This regulates the operation of the kernel Send() and Wait() interfaces.

ShareMap: The set of cells with which this cell can share permanent segments.

Cell State

The cell state is dynamic information about the cell. It is maintained as a map from CellID to CellState, where CellState is one of Idle, Running, or Waiting. This mapping is called the CellStateMap.

Strand Descriptor

All of the information in the strand descriptor is static information about the strand. There are seven items in the strand descriptor:

CellID: The identifier of the cell that contains the strand. This can be used to look up the cell descriptor of the cell containing the strand.

ProcessorMode: Either foreground or background. If the mode is foreground, the cell is run with interrupts enabled. If the mode is background, the cell is run with interrupts disabled. A background cell can be used to implement a device driver strand, which requires access to hardware resources without fear of interrupt from the hardware.

EntryPoint: The address of the StrandEntryPoint function.

StackPointer: Where to begin the stack when the StrandEntryPoint is run. The stack pointer must point at an address within a permanent segment of the cell of the strand, or to an assigned segment required by the strand in the SDAssignedSegmentList. The kernel table builder, not the kernel itself, enforces this restriction.

Priority: The priority of the strand.

ScratchSizeMap: The scratch memory requirements of the strand. There are four sizes of scratch segments: Tiny, Small, Medium and Large. The scratch size map defines how many of each of these scratch segments sizes are required by the strand.

SDAssignedSegmentList: The assigned segments required by the strand.

Assigned segments are used to share scarce resources between strands. The strand descriptors are kept in the StrandDescriptorTable, which is a total mapping from StrandID to StrandDescriptor.

Initial Strand

There is a configuration parameter called InitialStrand used by the kernel. This is static strand information. When the kernel has completed initialization, it launches the strand indicated by the InitialStrand configuration parameter.

Resource Availability for a Strand

A concept that comes up repeatedly in the description of the kernel is resource availability, so it is discussed separately here to aid understanding of the description of the kernel.

Execution of a strand may require allocation of resources. The resources that may be allocated are scratch and assigned segments. Resource availability for a strand means:

There are enough available scratch segments of the sizes specified in the ScratchSizeMap of the StrandDescriptor.

The assigned segments required by the strand are all available. This can mean one of the following:

The assigned segments are completely free.

The assigned segments are part of the message to launch the strand.

The assigned segments have been kept by the strand on the prior execution of the strand.

Runnability of a Strand

A related concept to resource availability for a strand is the runnability of a strand. A strand is runnable when:

The resources required by the strand are available.

The strand is not marked blocked.

Strand Startup

When a strand begins, it has several standard arguments, which are passed to it by the kernel. The parameters are passed utilizing the registers/stack. The strand must have sufficient stack space for the stacked parameters along with any space necessary for local data. The variables that are initialized with their values and available for a strand to use when it starts are as follows:

SourceStrandID is the ID of the strand, which sent the message.

Command is a 32-bit message from the sending cell.

ScratchSegmentList is a structure consisting of the number of scratch segments along with each segment's address and size.

Message is a structure consisting of the number of message segments along with each segment's address and size.

Depth represents the level of nested Remote Procedure Calls (RPC) that this strand is being started within. A length of zero means that the strand is being started by a Message_Send call. A length which is greater than zero, represents the number of nested RPCs.

Exception Handling

Exception processing allows a strand to transfer control to the exception handler specified in the cell descriptor for the cell. This feature is similar to a jump and should be used to handle cases where abnormal conditions arise.

The exception code is the only parameter passed to the exception handler by the currently running strand. The exception code should contain the error code that resulted in the exception. Preferably, the system reserves the first 32 exception codes (0->31) for current and future growth. Each cell is free to use the other exception codes as needed.

What is claimed is:

1. A method of allocating memory for a first task and a second task in a computer-implemented system, where the tasks are executed by an operating system residing on the computer-implemented system, comprising the steps of:

providing predefined memory requirements for the first and second tasks, the predefined memory requirements include a permanent memory component and a transient memory component, wherein the memory requirements are a function of the respective tasks and are determined at compile time;

allocating a memory space for the first task according to the predefined memory requirements associated with the first task, the transient memory component being accessible to the first task only during execution of the first task;

executing the first task only when the memory space available to the first task at least meets the predefined memory requirements for the first task and preventing the first task from receiving an additional memory space that exceeds the predefined memory requirements for the first task;

allocating additional memory to the second task without exceeding its predefined memory requirements by:

transmitting, by the first task, a portion of the transient memory component to the second task; and upon transmission of the portion, releasing access to the portion by the first task wherein the second task receives additional components without performing an allocation of additional memory.

2. The method of claim 1 further comprising the step of initializing the portion of the transient memory component prior to the step of allocating a memory space for the first task.

3. The method of claim 1 wherein the step of allocating a memory space for the first task further includes the steps of:

assigning at least one logical address for accessing the memory space associated with the first task, whereby the first task accesses the memory space using the logical address;

requesting allocation of the memory space using the logical address for the memory space;

translating each logical address for accessing the memory space into a corresponding physical address; and allocating the memory space for the first task using the physical addresses.

4. A method for providing separation between a plurality of cells in a computing system, the method comprising the steps of:

allocating a predefined amount of memory having a first permanent component and a transient component in a first cell to a first task in the first cell, wherein the allocation is based on the first tasks memory requirements which are a function of the first task and are determined at compile time, the first task having access to only the first permanent component prior to launch and the transient component comprising a plurality of segments;

receiving, by the first task, the transient component upon launch of the first task; and losing access to each segment that the first task transmits to a second task in a second cell, wherein the second task has memory requirements for permanent and transient components that are a function of the second task and are determined at compile time and the transmission of the segments allows the second task to receive additional components without performing an allocation of additional memory.

5. The method of claim 4, further comprising the step of losing access to the plurality of segments when the first task is terminated such that the first task only has access to the first permanent component.

6. The method of claim 4, wherein the receiving step comprises the step of receiving each segment at a respective same memory address each time the first task is launched.

7. The method of claim 4, wherein the second task has access to a second permanent component in the second cell, the method further comprising the steps of:
   receiving, by the second task, each segment transmitted by the first task;
   launching the second task upon receipt of a received segment; and
   gaining access, by the second task, to each segment that the first task transmits to the second task such that the second task only has access to each received segment and the second permanent component.

8. The method of claim 7, further comprising the steps of:
   terminating the second task;
   losing access, by the second task, to each received segment upon termination of the second task; and
   regaining access, by the first task, to each received segment upon termination of the second task.

9. The method of claim 7, further comprising the step of prohibiting the second task from transmitting each received segment to another task.

10. The method of claim 7, further comprising the step of prohibiting the second task from transmitting each received segment to the first task prior to termination.

11. The method of claim 4, wherein the losing step comprises the step of losing access to a message segment of the plurality of segments that the first task transmits to the second task.

* * * * *